United States Patent [19]
Hower, Jr. et al.

[11] Patent Number: 5,467,434
[45] Date of Patent: Nov. 14, 1995

[54] APPARATUS AND METHOD FOR DETERMINING PRINTER OPTION AVAILABILITY AND REPRESENTING CONFLICT RESOLUTION IN A COMBINATION OF PRINT JOB SELECTIONS

[75] Inventors: John D. Hower, Jr., Fairport; Michael L. Campanella, Webster, both of N.Y.

[73] Assignee: Xerox Corporation, Stamford, Conn.

[21] Appl. No.: 936,477

[22] Filed: Aug. 28, 1992

[51] Int. Cl.⁶ .................................................. G06F 15/00
[52] U.S. Cl. ........................................ 395/114; 395/112
[58] Field of Search ................................ 395/110, 114, 395/112, 109, 101, 200, 325, 500; 358/407, 408, 402, 467, 468; 400/70, 71, 72, 73, 74, 75; 355/200, 202, 210, 77

[56] References Cited

U.S. PATENT DOCUMENTS

| | | | |
|---|---|---|---|
| 4,970,554 | 11/1990 | Rourke | 355/202 |
| 5,049,929 | 9/1991 | Anderson et al. | 355/204 |
| 5,113,355 | 5/1992 | Nomura | 395/109 |
| 5,129,639 | 7/1992 | Dehority | 270/1.1 |
| 5,179,637 | 1/1993 | Nardozzi | 395/114 |
| 5,228,118 | 7/1993 | Sasaki | 395/114 |
| 5,361,332 | 11/1994 | Yoshida et al. | 395/114 |

FOREIGN PATENT DOCUMENTS 2177824  1/1987  United Kingdom .

OTHER PUBLICATIONS

Panl Hammond, "Workstation Power Speeds Up Printing", Computer Technology Review, vol. 12, No. 8, Jul. 1992, Los Angeles US, p. 12.

*Primary Examiner*—Raymond J. Bayerl
*Assistant Examiner*—Dov Popovici
*Attorney, Agent, or Firm*—Gary B. Cohen

[57] ABSTRACT

A printing arrangement of the type having a printer bank with a plurality of printers which are respectively associated with printer profiles and each of the printer profiles has a list of printer properties available at the printer with which the printer profile is associated. The printing arrangement includes: an input section, located remotely from the printer bank, with a user interface for programming a combination of print job selections and a memory section for storing a selected one of the printer profiles; and a combination examiner for comparing the programmed combination of print job selections from the user interface with a combination of printer properties available in the selected one of the printer profiles from the memory section. The combination of print job selections is transmitted to one of the plurality of printers associated with the selected one of the printer profiles when the combination of print job selections corresponds with the combination of printer properties available at the selected printer.

18 Claims, 19 Drawing Sheets

*— 35-1*

```
Typical ASCII Job Ticket

%XRXbegin:            1.31
%XRXdisposition:      PRINT
%XRXsenderName:
%XRXtitle:            PostScript File
%XRXcopyCount:        1
%XRXpaperType-size:   216   279
%XRXdocumentPaperColors: white
%XRXpaperType-opacity: opaque
%XRXpaperType-preFinish:   Plain 0  0
%XRXrecipientName:
%XRXrequirements:     simplex
%XRXsignature:        FALSE
%XRXsourceFile:       . . .
%XRXdeleteSource:     FALSE
%XRXxImageShift:      5
%XRXyImageShift:      0
%XRXend
```

*FIG. 3*

```
BEGIN MEDIA DESCRIPTIONS
{
    PAGE SIZE = SIZE1(x),SIZE1(y)
    {
        MEDIA COLOR = STRINGC1
        {
            MEDIA WEIGHT = W1
            {
                MEDIA TYPE = STRINGT1
                MEDIA TYPE = STRINGT2
                    ...
                MEDIA TYPE = STRINGTn
            }
            MEDIA WEIGHT = W2
            {
                MEDIA TYPE = STRINGT1
                MEDIA TYPE = STRINGT2
                    ...
                MEDIA TYPE = STRINGTn
            }
            MEDIA WEIGHT = STRINGWn
            {
                MEDIA TYPE = STRINGT1
                MEDIA TYPE = STRINGT2
                    ...
                MEDIA TYPE = STRINGTn
            }
        }
        MEDIA COLOR = STRINGC2
        {
            MEDIA WEIGHT = W1
            {
                MEDIA TYPE = STRINGT1
                MEDIA TYPE = STRINGT2
                    ...
                MEDIA TYPE = STRINGTn
            }
            MEDIA WEIGHT = W2
            {
                MEDIA TYPE = STRINGT1
                MEDIA TYPE = STRINGT2
                    ...
                MEDIA TYPE = STRINGTn
            }
            MEDIA WEIGHT = STRINGWn
            {
                MEDIA TYPE = STRINGT1
                MEDIA TYPE = STRINGT2
                    ...
                MEDIA TYPE = STRINGTn
            }
        }
            •
            •
        MEDIA COLOR = STRINGCn
        {
            MEDIA WEIGHT = W1
            {
                MEDIA TYPE = STRINGT1
                MEDIA TYPE = STRINGT2
                    ...
                MEDIA TYPE = STRINGTn
```

*FIG. 6A*

GOTO FIG. 6B

```
        }
        MEDIA WEIGHT = W2
        {
                MEDIA TYPE = STRINGT1
                MEDIA TYPE = STRINGT2
                        ...
                MEDIA TYPE = STRINGTn
        }
        MEDIA WEIGHT = STRINGWn
        {
                MEDIA TYPE = STRINGT1
                MEDIA TYPE = STRINGT2
                        ...
                MEDIA TYPE = STRINGTn
        }
    }
}
PAGESIZE = SIZE1(x),SIZE1(y)
{
    MEDIA COLOR = STRINGC2
    {
        MEDIA WEIGHT = W1
        {
                MEDIA TYPE = STRINGT1
                MEDIA TYPE = STRINGT2
                        ...
                MEDIA TYPE = STRINGTn
        }
        MEDIA WEIGHT = W2
        {
        }
    }
}
}
END MEDIA DESCRIPTIONS
```

FROM FIG. 6A

*FIG. 6B*

```
KEYWORD
{
    VALUE 1
    {
        rule1
        rule2
        ...
        rulen
    }
    VALUE 2
    {
        rule1
        ...
        rulen
    }
    VALUE n
    {
        rule1
        ...
        rulen
    }
}
```

*FIG. 7A*

```
BEGIN MEDIARANGES
    {
        PAGESIZE
        {
            PAGESIZE[1] < 203
            {
                R       PAGESIZE[1]:203,432
                R       PAGESIZE[2]:254,363
            }
            PAGESIZE[1] > 432
            {
                R       PAGESIZE[1]:203,432
                R       PAGESIZE[2]:254,363
            }
            PAGESIZE[2] > 254
            {
                R       PAGESIZE[1]:203,432
                R       PAGESIZE[2]:254,363
            }
            PAGESIZE[2] > 363
            {
                R       PAGESIZE[1]:203,432
                R       PAGESIZE[2]:254,363
            }
            PAGESIZE[1] > 229
            {
                R       PAGESIZE[2]:254,297
            }
        }
        MEDIATYPE
        {
            TRANSPARENCY
            {
                R       PAGESIZE[1]:203,229
                R       PAGESIZE[2]:254,363
            }
            PRECUTTAB
            {
                R       PAGESIZE[1]:203,229
                R       PAGESIZE[2]:254,363
                BN      MEDIACOLOR != CLEAR
            }
            DRILLEDPRECUTTAB
            {
                R       PAGESIZE[1]:203,229
                R       PAGESIZE[2]:254,363
                BN      MEDIACOLOR != CLEAR
            }
            TRANSPARENCY
            {
                BN      MEDIACOLOR != CLEAR
            }
        }
        MEDIAWEIGHT
        {
        }
        MEDIACOLOR
        {
            CLEAR
            {
                R       PAGESIZE[1]:203,229
                R       PAGESIZE[2]:254,363
            }
        }
    }
END MEDIARANGES
```

*FIG. 7B*

```
BEGIN MEDIA DESCRIPTIONS
{
    PAGE SIZE = 216,279
    {
        MEDIA COLOR = "WHITE"
        {
            MEDIA WEIGHT = 75
            {
                MEDIA TYPE = "PLAIN"
                MEDIA TYPE = "LOGO"
                MEDIA TYPE = "TAB"
            }
            MEDIA WEIGHT = 100
            {
                MEDIA TYPE = "PLAIN"
                MEDIA TYPE = "LOGO"}
            }
        }
        MEDIA COLOR = "BLUE"
        {
            MEDIA WEIGHT = 75
            {
                MEDIA TYPE = "PLAIN"
            }
            MEDIA WEIGHT = 150
            {
            MEDIA TYPE = "COVER"
            }
        }
        MEDIA COLOR = "CLEAR"
        {
            MEDIA WEIGHT = 300
            {
                MEDIA TYPE = "TRANSPARENCY"
            }
        }
    }
    PAGE SIZE = 216,356
    {
        MEDIA COLOR = "WHITE"
        {
            MEDIA WEIGHT = 75
            {
                MEDIA TYPE = "PLAIN"
                MEDIA TYPE = "LOGO"
            }
```

FIG. 10A

GOTO
FIG. 10B

```
                    }
FROM        MEDIA COLOR = "YELLOW"
FIG. 10A    {
                MEDIA WEIGHT = 75
                {
                    MEDIA TYPE = "LEGAL"
                }
            }
        }
    PAGE SIZE = 432,279
    {
        MEDIA COLOR = "WHITE"
        {
            MEDIA WEIGHT = 75
            {
                MEDIA TYPE = "TABLOID"
            }
        }
    }
}
END MEDIA DESCRIPTIONS
```

FIG. 10B

| MEDIA DESCRIPTION | |
|---|---|
| | |
| PAGE SIZE | 216 × 279 |
| | |
| MEDIA COLOR | WHITE |
| | |
| MEDIA WEIGHT | 75 |
| | |
| MEDIA TYPE | PLAIN |

| MEDIA DESCRIPTION | |
|---|---|
| | |
| PAGE SIZE | 216 × 356 |
| | |
| MEDIA COLOR | WHITE |
| | |
| MEDIA WEIGHT | 75 |
| | |
| MEDIA TYPE | TAB |

```
BEGIN FINISHING RULES
{
    DUPLEX
    1
    {
        TRUE
        {
            BN    MEDIA TYPE! = TRANSPARENCY,PRECUT TAB, DRILLED PRECUT TAB
            BN    MEDIA COLOR! = CLEAR
        }
        FALSE
        {
            BN    SIGNATURE! = TRUE
        }
    }
    TUMBLE
    1
    {
        TRUE
        {
            BN    MEDIA TYPE! = TRANSPARENCY,PRECUT TAB, DRILLED PRECUT TAB
            BN    MEDIA COLOR! = CLEAR
            BN    SIGNATURE! = TRUE
        }
        FALSE
        {
        }
    }
    COLLATE
    1
    {
        TRUE
        {
        }
        FALSE
        {
            BN     STAPLE LOCATION! = DUAL LANDSCAPE
            BN     SLIPSHEET! = TRUE
            && STAPLE = = TRUE
            {
                R      NUMCOPIES:2,70
            }
            && BIND = = TRUE
            {
                R      NUMCOPIES:7,125
            }
        }
    }
    BIND
    1
    {
        TRUE
        {
            R      PAGE SIZE [1]: 203,229
            BE     PAGE SIZE[2] = =279
            BN     STAPLE! = TRUE
            BN     BOOKLET! = TRUE
            BN     SIGNATURE! = TRUE
            BN     SLIPSHEET! = TRUE
            && COLLATE = =FLASE
```

*FIG. 14A*

GOTO
FIG. 14B

```
            {
       R    NUMCOPIES: 7,100
            }
        }
    FALSE
    {
    }
}

STAPLE
1
{
    TRUE
    {
        R     PAGE SIZE [1]: 203,229
        R     PAGE SIZE[2]:254,363
        BN    BIND ! = TRUE
        BN    SLIPSHEET ! = TRUE
    }
    FALSE
    {
        BN    BOOKLET ! = TRUE
    }
}

STAPLE LOCATION
1
{
    SINGLE PORTRAIT
    {
        R     PAGE SIZE [1]: 203,229
        R     PAGE SIZE[2]:254,363
        BN    BIND ! = TRUE
        BN    SLIPSHEET ! = TRUE
        BN    SIGNATURE ! = TRUE
        BN    BOOKLET ! = TRUE
        && COLLATE = = FALSE
        {
            R    NUMCOPIES: 2,70
        }
    }
    SINGLE LANDSCAPE
    {
        R     PAGE SIZE [1]: 203,229
        R     PAGE SIZE[2]:254,363
        BN    BIND ! = TRUE
        BN    SLIPSHEET ! = TRUE
        BN    SIGNATURE ! = TRUE
        BN    BOOKLET ! = TRUE
        && COLLATE = = FALSE
        {
            R    NUMCOPIES: 2,70
        }
    }
    DUAL LANDSCAPE
    {
        R     PAGE SIZE (x) = = 17
        R     PAGE SIZE(y) = = 11
        BN    BIND ! = TRUE
        BN    SLIPSHEET ! = TRUE
        BN    COLLATE ! = FALSE
```

FROM FIG. 14A

*FIG. 14B*

GOTO FIG. 14C

```
        }
    }
    BOOKLET
    1
    {
        TRUE
        {
            BE    PAGE SIZE [1]: 432
            BE    PAGE SIZE[2]:279
            BN    MEDIA TYPE! = TRANSPARENCY
            BN    MEDIA COLOR! = CLEAR
            BN    BIND! = TRUE
            BN    SLIPSHEET! = TRUE
            BE    STAPLE= =TRUE
            BE    STAPLE LOCATION = =DUAL LANDSCAPE
        }

FALSE
        {
        }
    }
    SIGNATURE
    1
    {
        TRUE
        {
            BN    MEDIA TYPE!= TRANSPARENCY,PRECUT TAB, DRILLED PRECUT TAB
            BN    MEDIA COLOR!= CLEAR
            BE    DUPLEX! = TRUE
            BN    TUMBLE! = TRUE
            BN    BIND! = TRUE
            && STAPLE = = TRUE
            {
                BN STAPLE LOCATION! = SINGLE PORTRAIT, SINGLE LANDSCAPE
            }
        }
        FALSE
        {
        }
    }
    SLIPSHEET
    1
    {
        TRUE
        {
            BE    COLLATE = = TRUE
            BN    BIND! = TRUE
            BN    STAPLE! = TRUE
            BN    BOOKLET! = TRUE
        }
        FALSE
        {
        }
    }
}
END FINISHING RULES
```

FROM FIG. 14B

*FIG. 14C*

APPARATUS AND METHOD FOR DETERMINING PRINTER OPTION AVAILABILITY AND REPRESENTING CONFLICT RESOLUTION IN A COMBINATION OF PRINT JOB SELECTIONS

The present invention relates generally to printing systems, and more particularly to a technique for determining whether a combination of print job selections is available at a given printer having a predetermined set of printer properties.

In a printing system referred to as a "network printing system," a number of client inputs, such as workstations, personal computers, and the like, typically are combined with one or more printer outputs through a network. In systems of this type, one of the client inputs sends electronic documents and electronic job programming instructions, both of which comprise a print job over the network to a printer selected for printing the print job. In effect, the programming instructions tell the printer that has been selected how to process the electronic documents of the job. One way of doing this is to use an electronic job ticket that is displayed on the screen of the client's User Interface. Using a mouse, keyboard, etc., the client selects from the menu of options in the job ticket displayed on the screen the choices that he desires.

Systems by their very nature are based on a collection or assemblage of different components and thus network printing systems can have a mix of input and output types, with consequent lack of compatibility between the system parts. Accordingly, one printer output may offer a wide variety of printing selections while a second printer in the same network system may have only a very limited number of choices. To avoid conflicts in printer programming, it is necessary that systems of this type be provided with a type of dialog, indicating to the user of a particular printer, inter alia, those printing selections which are available at that particular printer. In certain known arrangements, the user is typically shown, by way of a user interface, which printing selections are not available to him.

One example of such dialog is available in the DocuTech electronic printer ("DocuTech" is a trademark of Xerox® Corp.) manufactured by Xerox® Corp. The DocuTech™ electronic printer includes a print engine and an electronic subsystem having a plurality of processors. The processors are operated with a main executable computer program, the program coordinating dialog software for the print engine. Preferably the software serves to prevent the user from programming the print engine with a combination of printing selections which is not available thereat. Additionally, the dialog is, under certain circumstances, capable of suggesting an alternative combination to a conflicting combination chosen by the user.

The following patent and patent application are directed toward the dialogs employed in respective printing systems:

US-A-5,049,929 Patentees: Anderson et al. Issued: Sep. 17, 1991

US-A-5,129,639 Patentee: DeHority Issued: Jul. 14, 1992

U.S. patent application Ser. No. 07/752,155 entitled "Dialog Filtering" Applicants: Rosekrans et al. Filed: Aug. 29, 1991

US-A-5,049,929 discloses a reproduction system including, inter alia, a user interface providing for programming a plurality of features associated with the execution of a copying job. The system compares the most recently selected feature with all previously programmed features in order to identify any mutually exclusive or undesirable feature pairs.

US-A-5,129,639 discloses a system which compares print job requirements with the capability of a printer and determines a best match therebetween. Preferably, when a mismatch occurs, the system determines the best match between size, color, weight and type by determining a mismatch magnitude between the job paper requirements and the printer's paper capabilities or stocks. The paper with the lowest mismatch magnitude is designated. The system also determines the best match between the job requirements and the printer capability for stapling, folding, duplexing and stacking. The operator, rather than the user, is given an opportunity to correct any mismatches and the best match is used to configure the printer for the job if the user has specified a best match print strategy.

U.S. patent application Ser. No. 07/752,155 discloses a network printing system comprising a client coupled with a server, the client including a user interface coupled with a combining circuit, and the server including a plurality of print queues mapped respectively to a plurality of mask files by way of a queue configuration file. In operation, a combination of printing selections is programmed on the user interface and transmitted to a selected one of the print queues. With reference to the selected print queue, the queue configuration file then chooses an appropriate mask and communicates the mask to the combining circuit. Through use of the combining circuit, an interclient job ticket is combined with the mask so that the print selections available at the printer corresponding to the selected print queue are displayed to the user via the user interface.

In contrast, the present invention provides a printing arrangement of the type having a printer bank with a plurality of printers, the printers being respectively associated with printer profiles, each of the printer profiles having a list of printer properties available at the printer with which the printer profile is associated, the printing arrangement including: an input section, located remotely from the printer bank, with means for programming a combination of print job selections and a memory section for storing a selected one of the printer profiles; and means for comparing the programmed combination of print job selections from the programming means with a combination of printer properties available in the selected one of the printer profiles from the memory section wherein the combination of print job selections is transmitted to one of the plurality of printers associated with the selected one of the printer profiles when the combination of print job selections corresponds with the combination of printer properties available at the selected printer.

These and other aspects of the invention will become apparent from the following description, the description being used to illustrate a preferred embodiment of the invention when read in conjunction with the accompanying drawings.

FIG. 3 is a representation of a format for an electronic job ticket;

FIGS. 6A and 6B represent a format for a media description parameter section of a printer profile;

FIG. 7A is a generic representation of a format used to organize a set of rules in the printer profile;

FIG. 7B is a representation of an exemplary application of a set of rules in the printer profile, the set of rules being directed toward media ranges;

FIGS. 10A and 10B represent an exemplary media description section of the printer profile with values assigned to the media description parameters;

Figure 13:
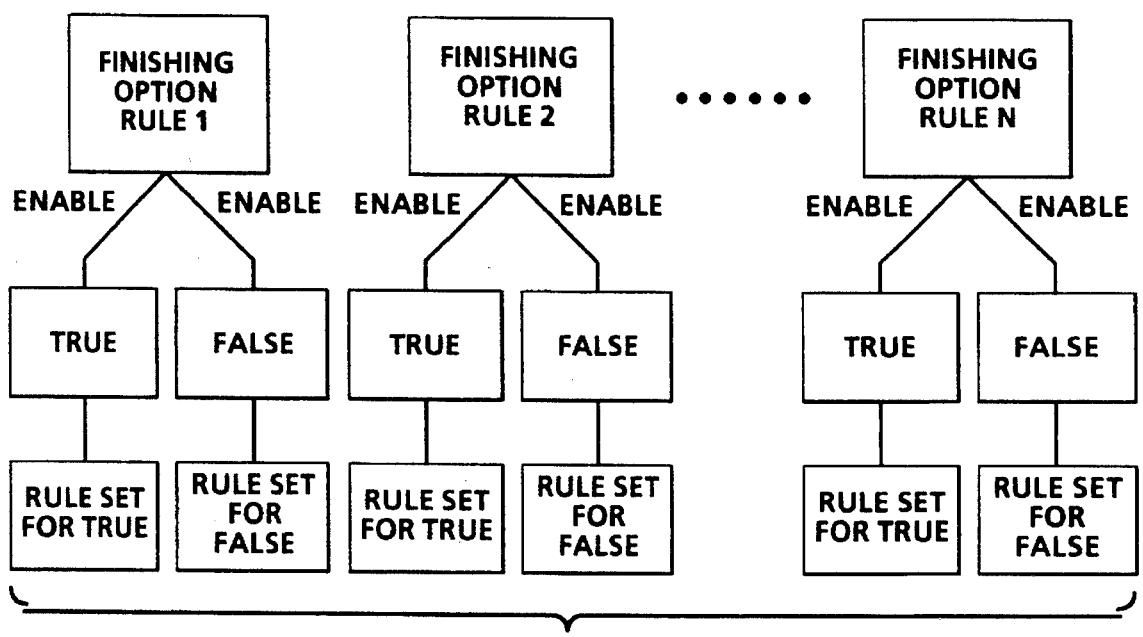

FIG. 13 is a schematic representation of the format used to organize finishing option rules in the printer finishing options availability and conflicts section of the printer profile; and FIGS. 14A–14C represent exemplary finishing option rules in the printer finishing options availability and conflicts section of the printer profile with values assigned and rules defined for various finishing option rules.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
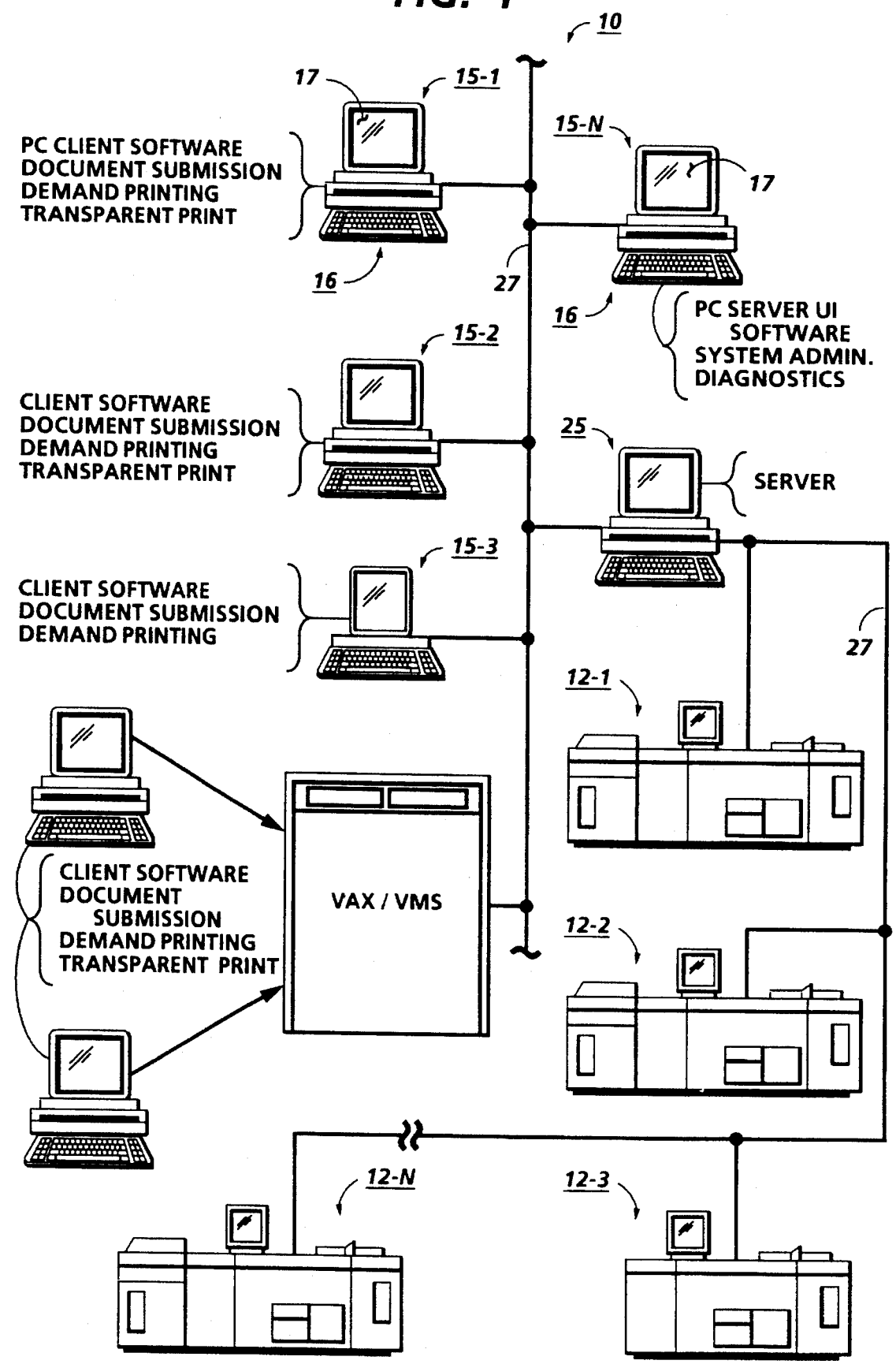
FIG. 1 is a schematic, elevational view of a network printing network printing system of FIG. 1.

Referring to FIG. 1, there is shown a network processing system 10 of the type adapted to incorporate the present invention. Processing system 10 comprises a plurality of printers 12-1, 12-2, 12-3, . . . 12-n for processing print jobs and making prints in accordance with the job programming instructions for each job printed. Printers 12-1, 12-2, 12-3, 12-n may be any suitable printer capable of producing prints on a print media such as paper from video image signals and may, for example, comprise laser printers, ink jet printers, ionographic printers, etc. In system 10, where multiple printers are integrated into a network processing system, individual printers typically have different document processing capabilities as will appear. As used herein, printers 12-1, 12-2, 12-3, . . . 12-n include virtual printers as discussed more fully hereinbelow.

System 10 provides print processing for various workstations or clients 15-1, 15-2, 15-3, . . . 15-n. Clients 15-1, 15-2, 15-3, . . . 15-n, which may be remote and/or on site, are operatively coupled to printers 12-1, 12-2, 12-3, 12-n through server 25 as will appear. Clients provide the electronic documents that are the source of the print jobs and for this purpose individual ones or all of clients 15-1, 15-2, 15-3, . . . 15-n may have a document scanner, disk input, keyboard, fax, etc. for generating the electronic documents that comprise the job to be printed. Clients 15-1, 15-2, 15-3, . . . 15n have a User Interface (UI) 16 with interactive screen 17 enabling programming selections for print jobs to be made, screen 17 displaying the various programming selections available in the form of a job ticket as will appear. Printers 12-1, 12-2, 12-3, . . . 12-n, clients 15-1, 15-2, 15-3, . . . 15-n, and server 25 are operatively interconnected by network or communication channels 27.

Figure 2:
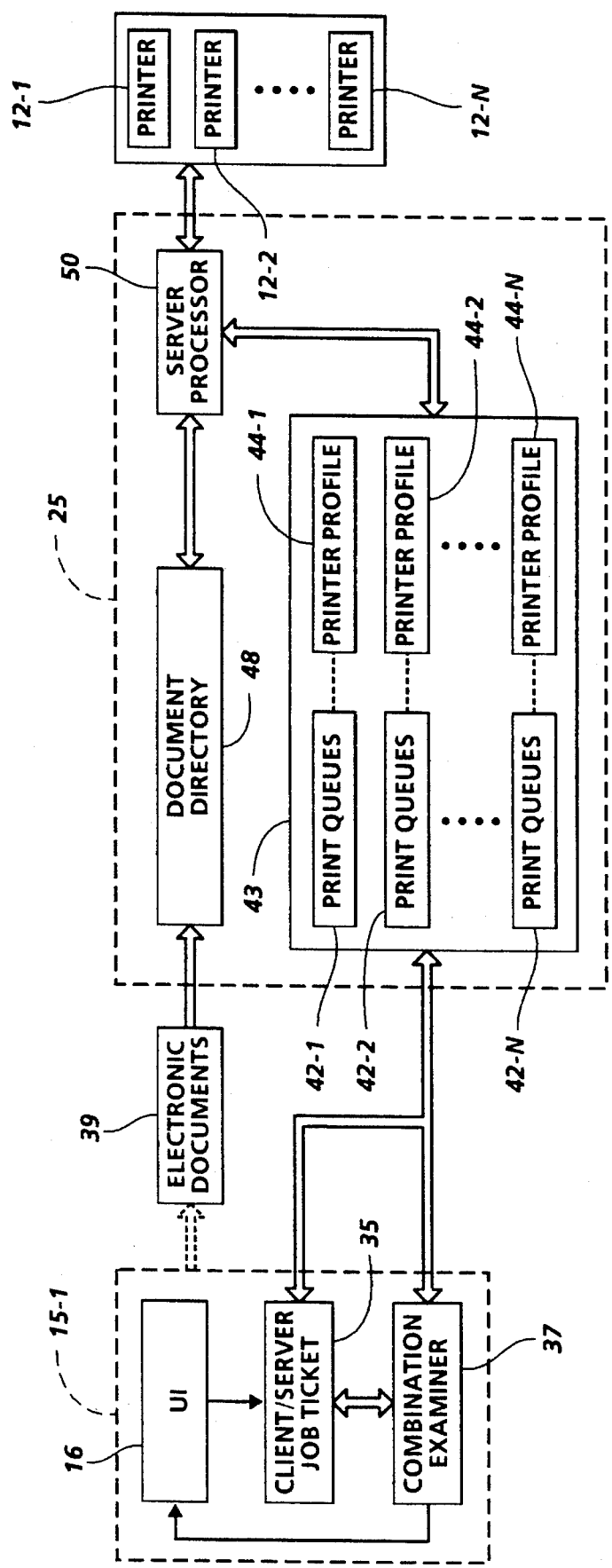
FIG. 2 is a partial, schematic, block diagramatic view of the network printing system of FIG. 1.

Referring to FIG. 2, the relationship of a single client, such as client 15-1, to the server 25 is shown in further detail. In the illustrated embodiment of FIG. 2, the client 15-1 includes one of the UIs 16 and an electronic job ticket 35, which job ticket 35 permits the user to program a print job for transmission to the server 25. Job ticket 35 contains the programming parameters for the job such as quantity, plex, enlargement, reduction, stock, finishing, etc. In one example, electronic documents 39, which include the information that is ultimately printed on print media, is transmitted from the client 15-1 to the server 25. The client 15-1 further includes a combination examiner 37, the significance of which will be discussed in further detail below.

Figure 4:
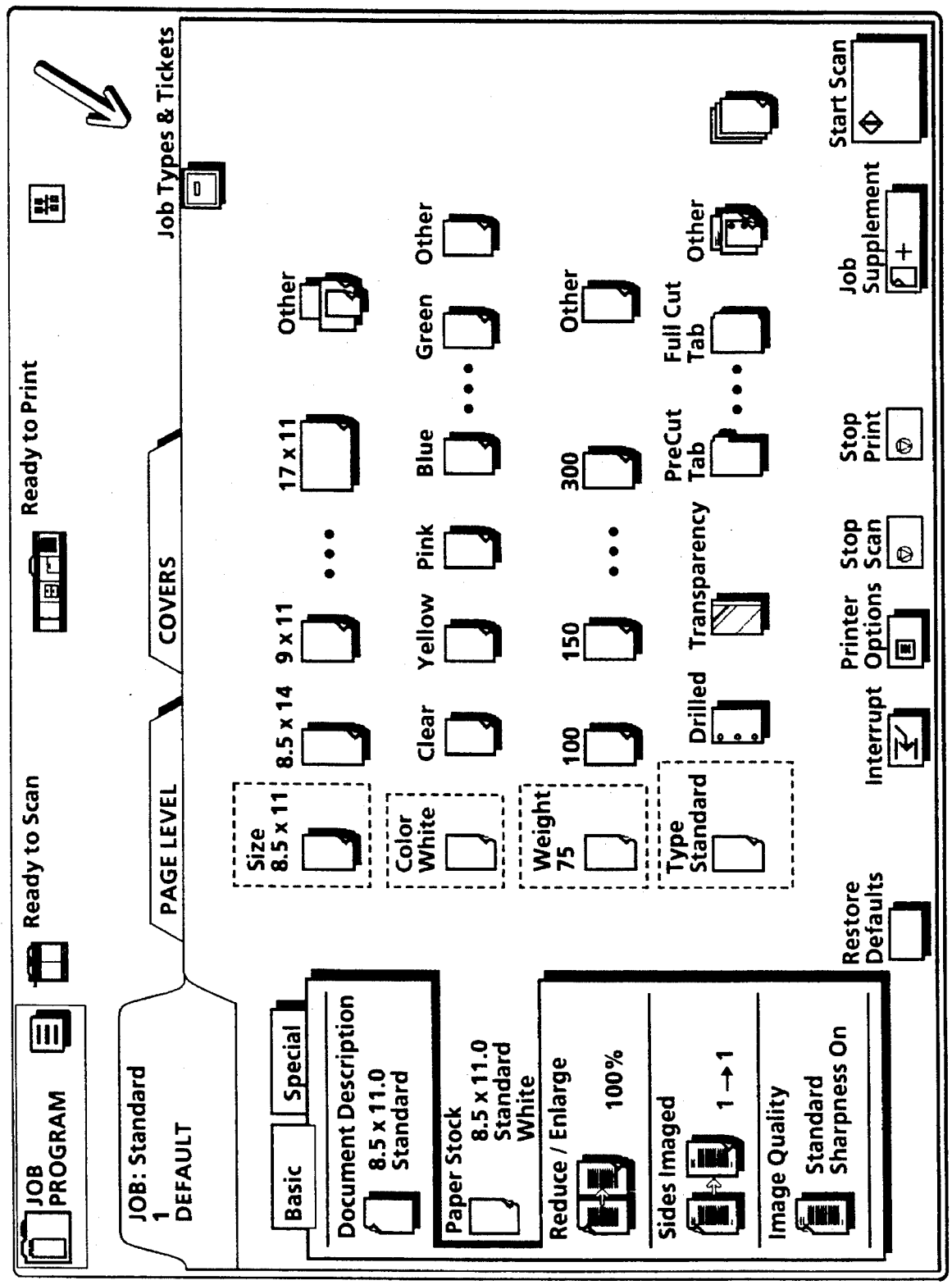
FIGS. 4 and 5 are representations of job tickets used to program portions of a print job as displayed on a client screen.
Figure 5:
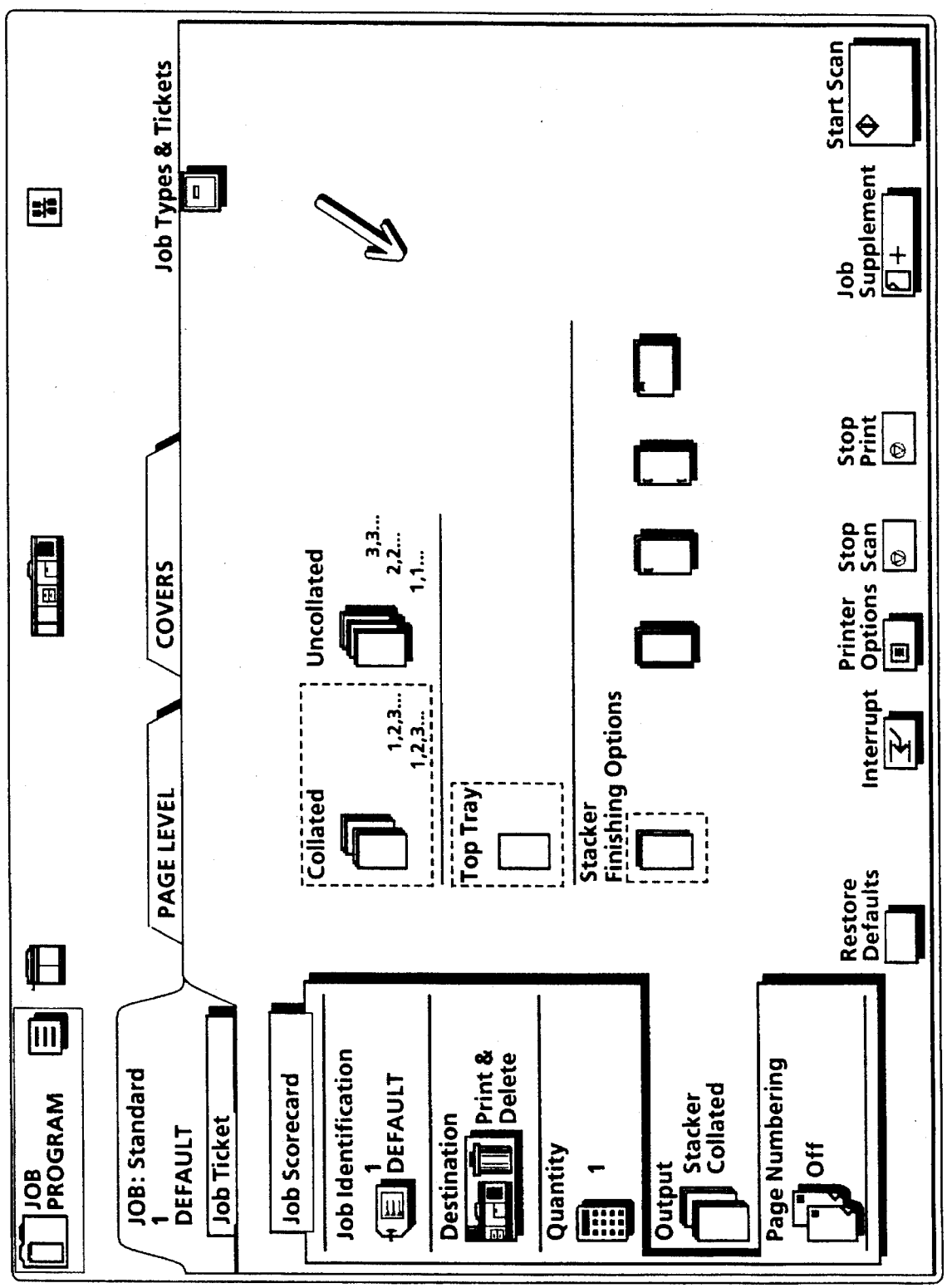

Referring to FIG. 3, the client/server job ticket 35 may assume an ASCII format. Additionally, by employment of suitable client UI interface dialog software, print job selections may be displayed on the screen 17 of the UI 16 so that the user can be apprised of which printing selections are available for programming a print job. Examples of job ticket displays are shown in FIGS. 4 and 5 of the drawings. In particular, the job ticket display of FIG. 4 permits the user to choose selected media description parameters while the job ticket display of FIG. 5 permits the user to choose finishing options. It should be appreciated that in practice, the display of FIG. 5 would include many more finishing options than are shown. Examples of finishing options other than those shown in FIG. 5 can be found below in FIGS. 14A–14C.

Referring again to FIG. 2, the server 25 includes one or more print queues 42-1, 42-2, 42-3, . . . 42-n, the print queues 42 being provided, for selection by the user, on a section or file 43. Each of the print queues 42 is mapped to one of configuration files or printer profiles 44-1, 44-2, . . . 44-n. Each of the printer profiles includes a list of printer properties, the properties, as explained in further detail below, being arranged advantageously to describe the combinations of print job selections available at a selected one of the printers 12. While, in the example of FIG. 2, the print queues 42 and printer profiles 44 are shown as being mapped in a one-to-one relationship, various other mapping arrangements are contemplated by the present invention.

Each of the print queues 42 is associated with a specific one of the printers 12. It should be recognized that there may be plural queues for the same printer, as in the case where virtual printers are provided. Accordingly, in the second example, a printer (referred to herein as virtual printer) may be set up to provide different printer functions, with a corresponding print queue and profile provided for each different printer setup.

In the preferred embodiment of the present invention, the combination examiner 37 includes a memory location for storing at least one copy of a printer profile 44 from file 43. Additionally, the combination examiner 37 includes software tools for comparing a combination of print job selections programmed with the UI 16 with a combination of printer properties provided in the stored printer profile. It should be appreciated that, in another embodiment contemplated by the present invention, the printer profile need not be copied into the combination examiner 37, rather combination examination could be performed collaboratively between the combination examiner 37 and a selected one of the print profiles 44 in the file 43. It should also be appreciated that the combination examiner 37 could be disposed at the server 25 without changing the concept underlying the present invention.

Preferably, the electronic documents 39 are placed in a document directory 48. The server 25 further comprises a server processor 50, the server processor 50 being capable of combining a set of documents 39 with a corresponding combination of print job selections to form a print job. One example of a server processor capable of combining a set of electronic documents, such as a print data (page description language) file and a corresponding combination of print job selections, such as a job ticket, into a job file for printing can be found in a patent application entitled "A Method for Translating a Plurality of Printer Page Description Languages," filed Jun. 12, 1992, Attorney's Docket No. 92186, the pertinent portions of which are incorporated herein. In the preferred embodiment of the present invention, printer profiles 44 are composed of 3 distinct segments:

a set of descriptions of printing media available at the associated printer (shown generally in FIGS. 6A and 6B);

a set of rules which describe the allowed ranges and interactions between media description parameters for the associated printer (shown generally in FIGS. 7A and 7B); and a set of rules which describe the finishing, formatting and output capabilities of the associated printer (shown for a particular printer in FIGS. 14A, 14B, and 14C).

Referring to FIGS. 6A and 6B, a format used to construct a printer media availability section for each of the printer profiles is shown. The printer media availability section contains keywords describing all available media description parameters and values suitable for a given installation of a printer. As illustrated by FIGS. 6A and 6B, parameters suitable for use in the format may include, but are not limited to, page size, media color, media weight and media type. In the illustrated example of FIGS. 6A and 6B, values for the parameters are expressed in terms of constants, such as "STRINGC", "STRINGT" or "W". Additionally, the media description parameters can be listed in an indented or embedded format with delimiters, indicated by the curly brackets "{" and "}", surrounding the parameters to form predetermined combinations of parameters. As described in further detail below, this embedding approach permits association of media description parameters as one logical quantity and allows for efficient searching of data structures.

Referring to FIGS. 7A and 7B, a component of the media description can be couched in terms of a print media ranges section containing keywords describing all available print media parameters and ranges of values suitable for use in a certain family of printers. Preferably, the ranges allowable for a given parameter are represented by a series of range rules for each parameter. Accordingly, each parameter may be evaluated by a rules evaluation program upon the occurrence of a request for a given media. The rules evaluation program can be stored as one of the software tools in the combination examiner 37 for permitting combination examination. Examples of the type of rule employed in the print media ranges section are shown in FIG. 7B and the general syntactic analysis of these rules will be explained in further detail below with respect to the discussion of FIGS. 14A-14C. Nonetheless, it can be appreciated, at this stage of the present discussion, there is no need to hard code rules in the combination examiner 37 since the rules can be stored flexibly in one of the printer profiles.

Figure 8:
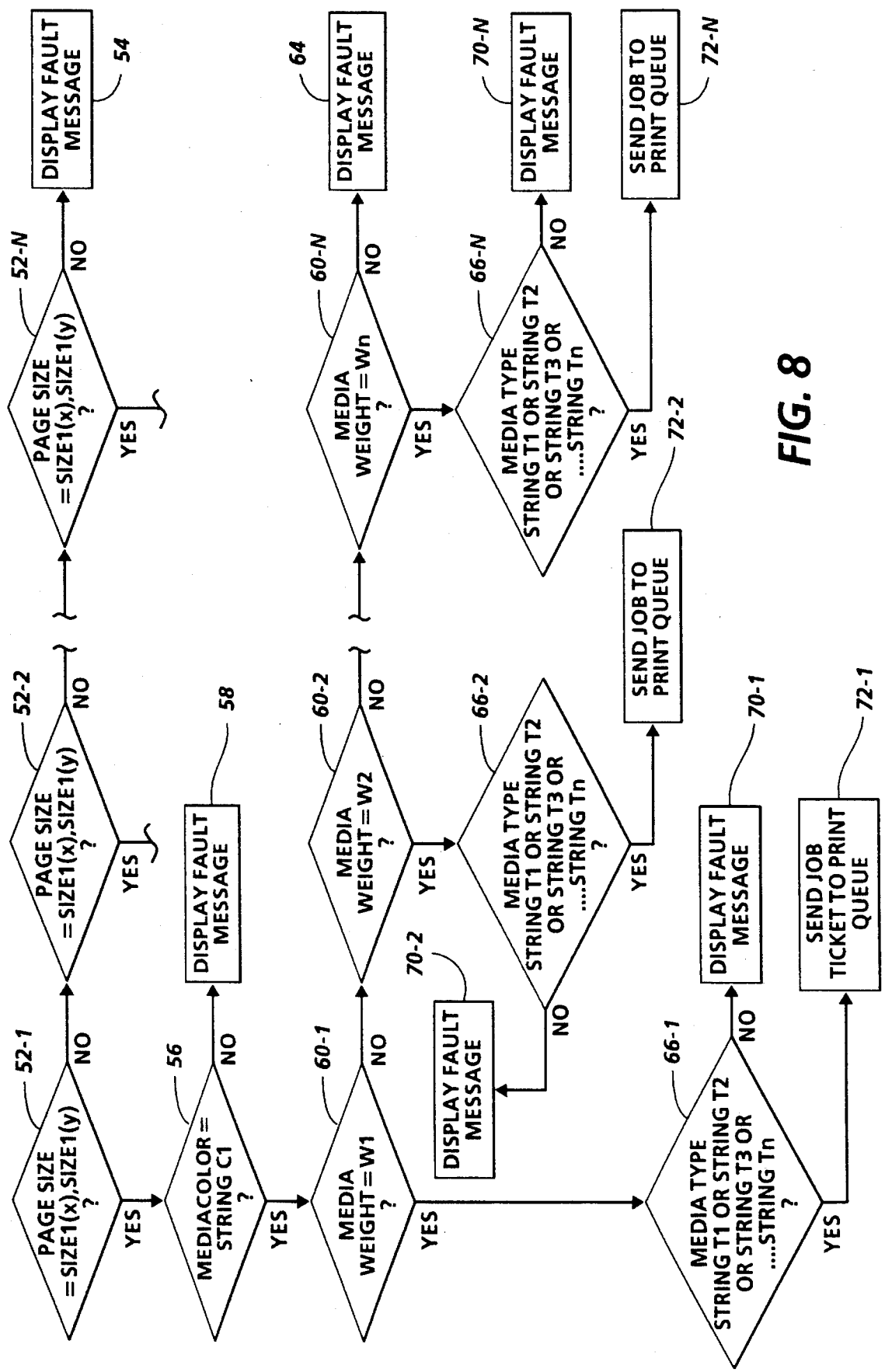
FIG. 8 is a flow diagram of a comparison or evaluation program used to implement the technique of the present invention.
Figure 9:
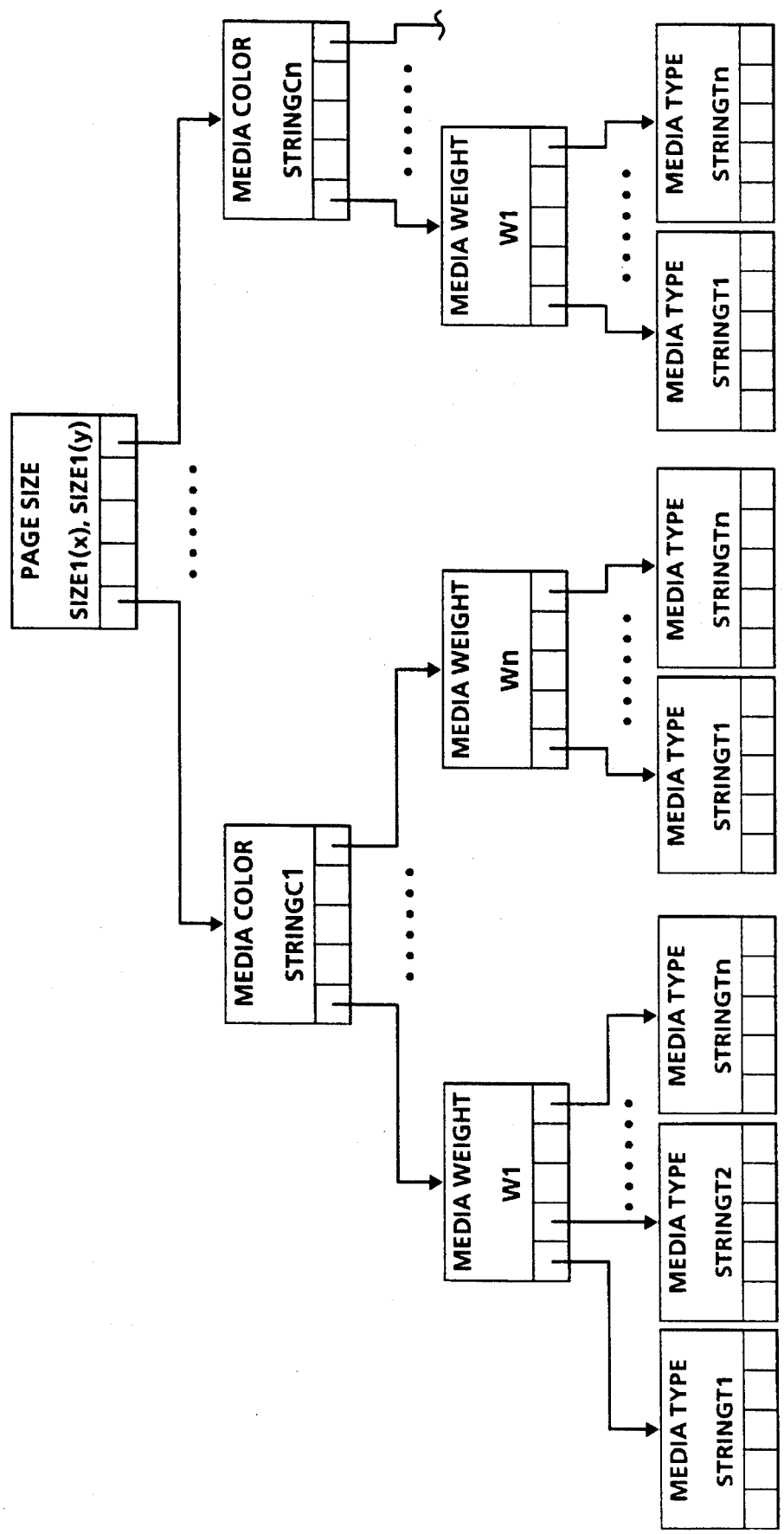
FIG. 9 is a schematic representation of the format of FIGS. 6A and 6B written in the form of a decision tree.

Referring to FIGS. 8, and 9, two exemplary approaches for comparing a programmed combination of print job selections and available combinations in a selected print profile are shown. While only two approaches are disclosed herein, it will be appreciated by those skilled in the art that other suitable approaches could be used to achieve the desired comparison without changing the underlying concept of the present invention.

To comprehend these two exemplary approaches fully, reference is made to the exemplary printer profile of FIGS. 6A and 6B, in which N available combinations of keywords are provided, and each combination includes such parameters as "PAGE SIZE", "MEDIA COLOR", "MEDIA WEIGHT" and "MEDIA TYPE" The comparison technique of FIG. 8 reflects a "brute force" approach for comparing a programmed combination with one or more available combinations of a printer profile. Since the flow diagram of FIG. 8 is constructed symmetrically for each combination of parameters, only a detailed description indicating the use of one of these printer profile combinations ("first printer profile combination") is provided herein. It will be understood that the comparison process is repetitive in that it proceeds, if necessary, through each printer profile combination in the same manner. Accordingly, with an understanding of how to write a flow diagram for first printer profile combination and how that combination is used in the comparison process, one of ordinary skill in the art can construct the omitted printer profile combinations of FIG. 8.

In practice, at step 52-1, the page size requested in the programmed combination from a selected client is compared to a page size for a first set of parameters in the printer profile. For a negative decision, the process proceeds to step 52-2 and, if necessary, through one or more of steps 52-3 ...52-N so that either the page size is found in the printer profile or a fault message is displayed on the UI 16 of the selected client (step 54). Provided that a positive decision results at step 52-1, a comparison for media color is performed at step 56. If the media color selected by the user does not equal STRING C1, a fault message is displayed (step 58), and if media color selected does equal STRING C1, then media weight is considered at step 60-1. If the selected media weight does not match any of values for MEDIAWEIGHT listed in steps 60-1, 60-2 . . . 60-N, then a fault message is displayed (step 64). Provided the selected media weight does equal either W1, W2 . . . WN, a comparison is made at either step 66-1, 66-2 . . . 66-N to determine if the media type selected by the user is in the first printer profile combinations. Through use of steps 66-1, 66-2 . . . or 66-N, it can be determined whether MEDIA TYPE equals STRINGT1, STRINGT2 . . . or STRINGTN. If, on the other hand, MEDIA TYPE does not equal one of these values, then a fault message is displayed at one of steps 70-1,70-2 . . . or 70-N. If MEDIA TYPE does equal one of these values then the job ticket 35 (FIG. 2) is transmitted to the print queue 42-1 (steps 72-1, 72-2, . . . 72-N) for use in printing the corresponding print job.

In the second approach (FIG. 9), the combinations of FIGS. 6A and 6B can be stored as nodes in one or more "decision trees" through use of a suitable pyramid coding technique. Preferably, the media description parameters are combined in the printer profile to facilitate parsing of the printer profile into one or more decision trees. Moreover, the tools for developing and using each decision tree are stored in the combination examiner 37 in the form of an application programming interface (API). The API preferably comprises a library of functions for parsing a printer profile into a decision tree, and an appropriate function for comparing the combination of print job selections programmed by a user with the combination(s) of a selected printer profile. In one example, commercially available parsing tools, such as "YACC", can be used to implement a parser for the combination examiner 37, the parser being capable of parsing any selected one of the printer profiles stored in the combination examiner 37. It should be appreciated that while the second approach contemplates the organization of parameters into one or more decision trees, the parameters for any given printer profile could be organized into any sort of link list(s) having a suitable hierarchical structure without undermining the basic concept of the present invention.

Figure 11:
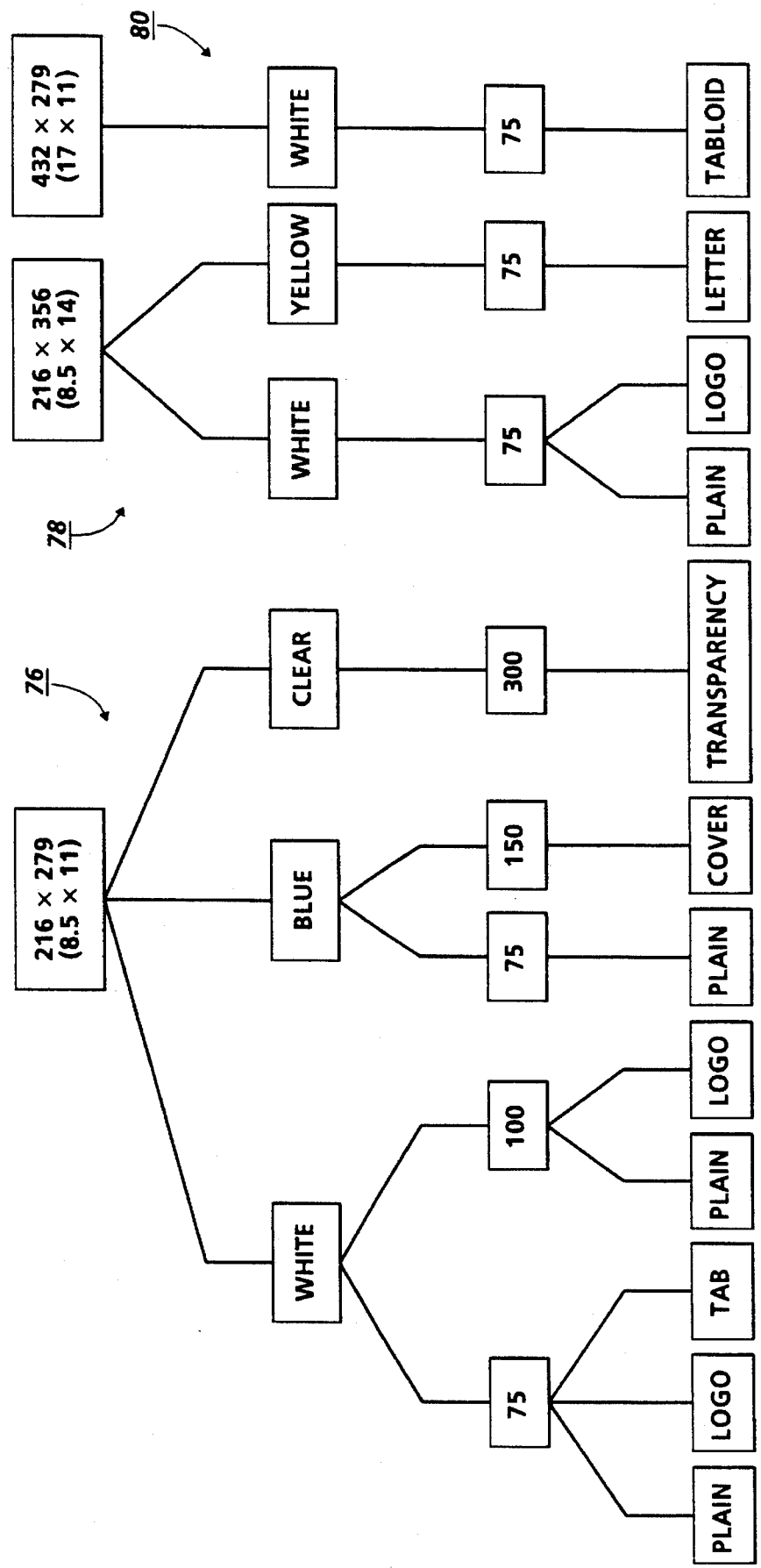
FIG. 11 is a representation of the media description section of FIG. 10A and 10B parsed into a plurality of decision trees.
Figure 12A:
FIGS. 12A and 12B are respective views of parameter blocks used to compare programmed combinations of media descriptions with combinations of printer properties shown in FIG. 11.

Referring to FIGS. 10A-10B, 11 and 12A-12B, an example illustrating the use of the API and a group of decision trees to compare a programmed combination of media description parameters with a group of combinations defined in a selected printer profile is explained in further detail. Referring specifically to FIGS. 10A and 10B, the selected printer profile with three combinations of media description parameters is shown. Through use of the parser, each combination of the selected printer profile is parsed into the decision trees 76, 78 and 80 of FIG. 11. The media description parameters are represented by nodes and each node is coded appropriately for storage in a memory section of the combination examiner 37. Referring to FIG. 12A, to compare a programmed combination of print job selections with the printer profile of FIG. 11, the parameters of the programmed combination can be inserted into a parameter block 82. In the preferred embodiment, the parameter block 82 resides in the API and the API is provided with a search function which permits the combination of print job selections in the parameter block 82 to be compared with the parameters in the various decision trees.

Figure 12B:

Referring to FIGS. 11 and 12A, in a first example of operation, a combination of print job selections are programmed by the user at a UI 16 and inserted into the parameter block 82. A comparison of these parameters with the decision tree 76 indicates that a permissible combination of print job selections has been programmed. Accordingly, the corresponding job ticket 35 (FIG. 2) is transmitted to one of the print queues 42. Referring to FIGS. 11 and 12B, in a second example of operation, a combination of print job selections are programmed by the user at a UI 16 and inserted into the parameter block 82. A comparison of these parameters with each of the decision trees 76, 78 and 80 (FIG. 11) indicates that an impermissible combination of print selections has not been programmed. Accordingly, a fault message is communicated from the combination examiner 37 to the UI 16 (FIG. 2) indicating to the user that an impermissible choice has been made.

The present invention contemplates various approaches to aiding the user in curing impermissible choices of the type described immediately above in the second example. For instance, suitable software could be provided to indicate what print job selections are actually available to the user-programmer. That is, in the second example, the user could be informed that only LOGO and PLAIN, rather than TAB, is available. Alternatively, a stock substitution routine, of the type disclosed in a patent application entitled "System for Identifying a Substitute Paper Stock for Unavailable Paper Stock when Printing a Job", filed Jul. 29, 1992, Attorney's Docket No. D/91540, the pertinent portions of which are incorporated herein, could be used to substitute automatically LOGO or PLAIN for TAB.

Each printer profile may include a printer finishing options availability and conflicts section and each of these sections preferably includes a set of keywords or parameters associated with finishing capabilities of a particular printer family. In particular, each section includes information regarding whether specific finishing options are enabled, and a list of rules associated with each value of a printer finishing option keyword. The list of rules associated with each keyword may include one or more rules couched in the form of range rules. As mentioned above, range rules can be used in the media description parameter section of a given printer profile.

The rules may also comprise two argument logical operations or the like. Types of acceptable operations available in a given printer profile may be expanded or restricted by simply modifying the given printer profile. It should be recognized that rules reside in the comparison or evaluation software of the the printer profile, rather than the combination examiner 37, so that the comparison or evaluation software need not be reprogrammed each time a new finishing capability is provided to one of the printers. Programming the rules in the printer profile, rather than the comparison or evaluation software, provides the comparison technique with a high degree of flexibility. That is, as new finishing features are added to the system, the printer profile can be accessed readily and reprogrammed with one or more appropriate finishing rules. It should also be recognized that flexibility of the comparison technique is maximized when the values for the rules are not hard-coded.

Referring to FIG. 13, the organization of a typical printer finishing options availability and conflicts section of a selected printer profile is shown. As illustrated by FIG. 13, each of the finishing option rules can be represented by a "TRUE" state or a "FALSE" state. A set of rules can be provided, if necessary, for each of the TRUE and FALSE states. In one example, the "RULE SET FOR FALSE" comprises an empty set of finishing options.

Referring to FIGS. 7B and 14A–14C, an exemplary implementation of the printer media range and finishing options availability and conflicts section of FIGS. 7A and 13 is shown. In this exemplary implementation, the syntax of the logical rules follows:

```
0 = Not Enabled
1 = Enabled
BN(Boolean Negative) followed by an "!" = Left May
                                              Not Equal
                                              Right
BE(Boolean Equality) = Left Must Equal Right
R(Range Rule: Expressed as Range) = Parameter > or
                                              = to left and >
                                              or = to right
&& = Additional Condition
```

In the example of FIGS. 14A-14C, the first field under each keyword (i.e., the descriptors "DUPLEX", "TUMBLE", etc.) indicates whether that finishing option rule is available in that particular printer profile. It should be apparent, from a review of FIGS. 7B and 14A–14C, that the rules, when compared with a programmed combination of media property and finishing options through employment of suitable comparison software, is capable of indicating, among other things, whether a specific type of paper is available, a given paper description parameter is within permissible boundaries, and a certain finishing option is available in combination with other options and/or specified paper types.

The set of rules for each media and finishing option rule is grouped in a hierarchical order so that the section can be written into a flow diagram or a decision tree in a manner similar to that used to develop a flow diagram or a decision for the media description parameters. Moreover, the concepts used to implement the software for comparing a combination of programmed media description parameters with one or more combinations of a media description parameters of a printer profile can be used as a basis for writing the software for comparing a combination of programmed print job finishing options with one or more combinations of the printer finishing options availability and conflicts section of FIGS. 7B and 14A–14C. In one example, each combination for a finishing option rule could be written into a flow diagram and compared with a programmed combination in accordance with a "brute force" approach. In another example, a group of software tools, such as the API referred to above, could be used to parse the media and finishing option rules of FIGS. 7B and 14A–14C into a link list, such as a decision tree, and compare a combination of programmed print job finishing options with the parsed combinations of the link list. The present invention further contemplates other implementations of the comparison software. For example, commercially available rules evaluation programs, could be used to perform the comparing technique.

Numerous features of the present invention will be appreciated by those skilled in the art.

One feature of the present invention is that it possesses a high degree of generality and can be expanded readily to comprehend any printer family. In particular, values, parameters and/or rules reside in printer profiles so that the software for the combination examiner need not be reprogrammed each time a new media description parameter or finishing option rule is added to the network printing system. The system is particularly flexible, since the system dialog can be reprogrammed by simply modifying one or more of the printer profiles.

Another feature of the present invention is that it is capable of apprising each client user of complex relationships between programmed parameters and/or rules. That is the comparison technique can be employed advantageously to examine a programmed combination of print job selections for determining whether that combination can be performed on a selected printer.

Yet another feature of the present invention it that is capable of resolving conflicts between finishing options through use of a simple, yet powerful set of rules which can be used to determine which finishing options can and cannot be achieved at a given printer.

What is claimed is:

1. A printing system having a printer bank with a plurality of printers, the printers being respectively associated with printer profiles, each of the printer profiles having a set of printer properties available at the printer with which the printer profile is associated, comprising:

an input section, being remote from the printer bank, including:

means for programming a combination of print job selections, and a memory section for storing a selected one of the printer profiles; and means for comparing the programmed combination of print job selections from said programming means with a subset of the set of printer properties available in the selected one of the printer profiles from said memory section, wherein the set of printer properties available in the selected one of the printer profiles comprises a hierarchical list of the print job selections, the combination of print job selections being transmitted to one of the plurality of printers associated with the selected one of the printer profiles when the combination of print job selections corresponds with the subset of the set of printer properties available at the one of the plurality of printers associated with the selected one of the printer profiles.

2. The printing system of claim 1, wherein a fault message is displayed at said programming means when the combination of print job selections does not correspond with the subset of the set of the printer properties available at the one of the plurality of printers associated with the selected one of the printer profiles.

3. The printing system of claim 1, wherein the printer properties are interrelated to one another by at least one rule.

4. The printing system of claim 3, wherein the at least one rule is expressed in a Boolean notation.

5. The printing system of claim 3, wherein the at least one rule corresponds to a selected one of a media selection, media property and finishing option available at the one of the plurality of printers associated with the selected one of the printer profiles.

6. The printing system of claim 1, wherein said printing system further comprises a server operatively coupling the printer bank with said input section.

7. The printing system of claim 6, wherein said server includes a print queue section with one or more print queues for storing jobs to be printed respectively at the printers of the printer bank with the printer profiles being mapped respectively with said print queues of said print queue section.

8. The printing system of claim 7, wherein said input section includes a job ticket for communicating the combination of print job selections from said input section to said print queue section.

9. The printing system of claim 8, wherein the printer properties of the hieparchical list are interrelated to one another by at least one rule.

10. A method of transmitting a print job, including electronic documents and a combination of print job selections, from a selected one of a client and a server to a selected one of a plurality of printers, the client including a user interface and the plurality of printers being associated with printer profiles, each of the printer profiles having a set of printer properties available at the printer with which the printer profile is associated, comprising the steps of:

programming the combination of print job selections with the user interface;

selecting one of the plurality of printers and accessing the printer profile associated with the selected printer;

interrelating the printer properties of the accessed printer profile with a set of rules relating to selected ones of media and finishing options available at the selected printer;

comparing a subset of the set of printer properties of the accessed printer profile with the programmed combination of print job selections to determine whether the combination of print job selections corresponds with the subset of the set of printer properties; and transmitting the combination of print job selections from the selected one of the client and the server to the selected printer when the programmed combination of print job selections corresponds with the subset of the set of printer properties.

11. The method of claim 10, further comprising the step of transmitting a fault message to a selected one of the user interface and the server when the combination of print job selections does not correspond with the subset of the set of printer properties.

12. The method of claim 10, wherein the comparing step comprises comparing the programmed combination of print job selections with the rules in the accessed printer profile to determine, at a selected one of the user interface and the server, whether the programmed combination can be printed at the selected printer.

13. The method of claim 10, further comprising the step of ordering a list the of print job selections of the accessed printer profile into a hierarchical list to facilitate the comparing step.

14. The method of claim 13, wherein the ordering step comprises the step of grouping the print job selections of the hierarchical list into preselected combinations.

15. The method of claim 14, further comprising the step of forming an embedded list with the preselected combinations.

16. The method of claim 13, further comprising the step of parsing the hierarchical list into a link list.

17. The method of claim 16, in which the link list comprises a decision tree defining the subset of the set of printer properties, wherein the comparing step comprises comparing the programmed combination of print job selections with the decision tree.

18. The method of claim 10, further comprising the step of coupling the user interface to the plurality of printers with at least one print queue, and wherein the transmitting step includes transmitting the programmed combination of print job selections to the print queue prior to transmitting the programmed combination of print job selections to the selected printer.

* * * * *